UNITED STATES PATENT OFFICE.

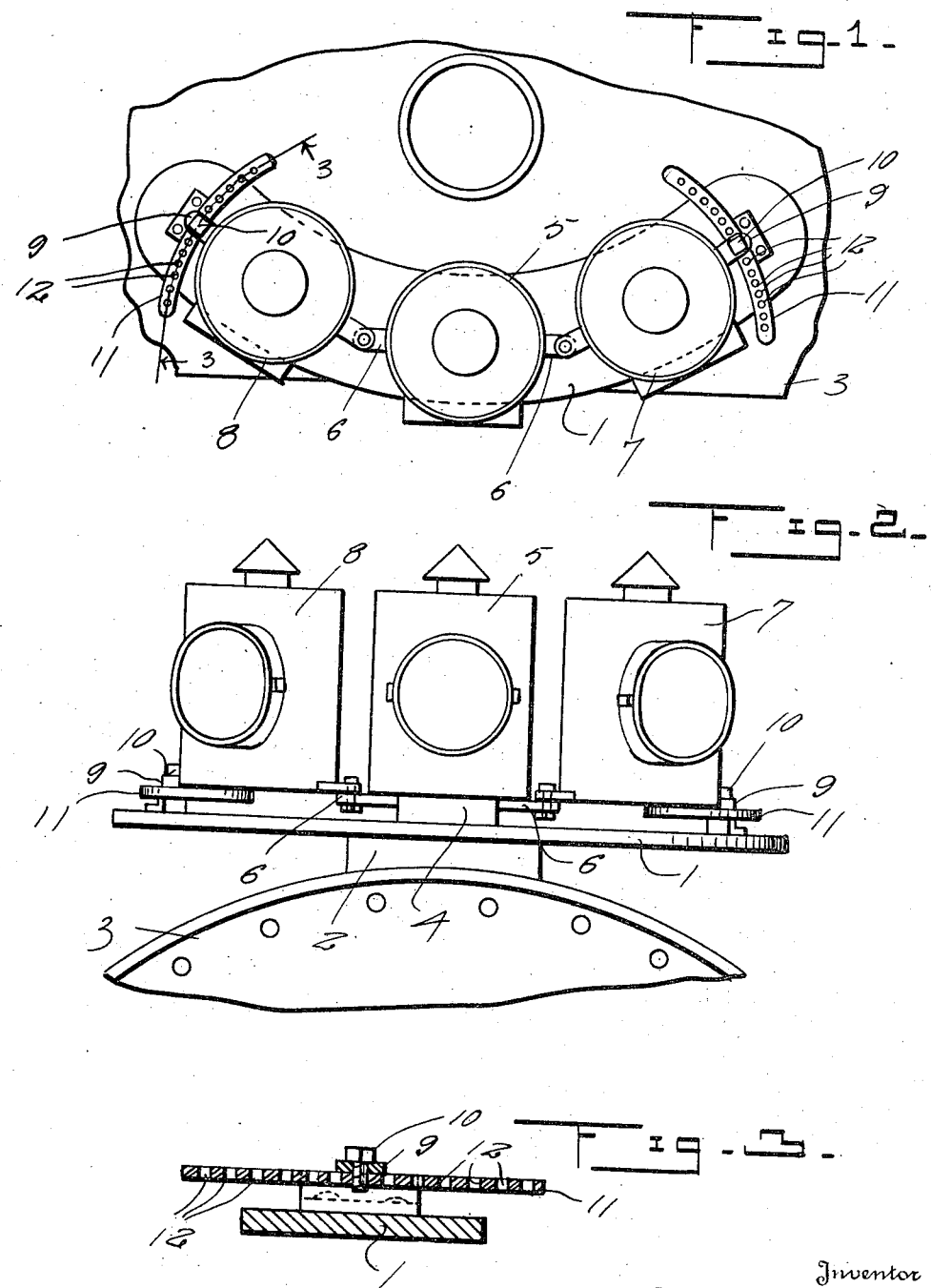

JAVAN C. BALLARD AND GEORGE NEWTON BALLARD, OF SINKS GROVE, WEST VIRGINIA.

HEADLIGHT.

1,250,765.  Specification of Letters Patent.  Patented Dec. 18, 1917.

Application filed July 26, 1917. Serial No. 182,952.

*To all whom it may concern:*

Be it known that we, JAVAN C. BALLARD and GEORGE NEWTON BALLARD, citizens of the United States, residing at Sinks Grove, in the county of Monroe and State of West Virginia, have invented certain new and useful Improvements in Headlights; and we do hereby declare the following to be a full, clear, and exact description of the invention, such as will enable others skilled in the art to which it appertains to make and use the same.

This invention relates to improvements in a headlight and more particularly to an illuminating means especially adapted for application upon locomotives and the like so that curves in the line of travel will be illuminated.

Another object of this invention is the provision of a support having mounted thereon, a plurality of lamps or headlights, which are arranged so as the light rays therefrom will be directed straight ahead and to each side thereof.

A further object of this invention is the provision of means for adjusting each of the end lamps of the series so that their rays of light may be directed upon each side of the locomotive for the purpose of illuminating curves in the line of travel.

A still further object of this invention is the provision of a headlight of the above stated character, which shall be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a top plan view of a headlight constructed in accordance with my invention.

Fig. 2 is a front elevation of the same,

Fig. 3 is a detail sectional view illustrating the means of adjusting the end lamp or headlight of the series.

Referring in detail to the drawing, the numeral 1 indicates an arcuate shaped support having a pedestal 2, which is secured to a locomotive 3 in any well known manner. A pedestal 4 is formed upon the support 1 intermediate its ends and has mounted thereon, a headlight or lamp 5 of any desired construction. The headlight 5 is so located upon the support 1 that the rays of light therefrom will be directed in front or straight ahead of the locomotive 3. Oppositely disposed arms 6 are formed upon the pedestal 4 and have pivoted thereto, lamps 7 and 8 of similar construction to the lamp 5. The lamps 7 and 8 have formed thereon, ears 9, which carry set screws 10.

Arcuate shaped members 11 are secured to each end of the support 1 and are provided with a plurality of apertures 12 for the purpose of receiving the set screws 10 for locking the lamps 7 and 8 at various angles with relation to the locomotive so that they may be adjusted for the purpose of directing the rays of light to each side of the locomotive, whereby curves in the line of travel of the locomotive will be illuminated.

While we have shown and described the preferred embodiment of our invention, it will be understood that minor changes in construction, combination and arrangement of parts may be made without departing from the spirit and scope of the invention as claimed.

What is claimed is:

A device of the character set forth comprising an arcuate shaped support adapted to be secured to a locomotive, a headlight secured to said support intermediate its ends, headlights pivoted to each side of the first named headlight, set screws carried by the second named headlights, and arcuate shaped members carried by said support adjacent each end and provided with a plurality of apertures to receive the set screws for holding the second named headlights in various adjusted positions.

In testimony whereof we affix our signatures in presence of two witnesses.

JAVAN C. BALLARD.
GEORGE NEWTON BALLARD.

Witnesses:
H. P. TRACY,
F. M. REED.

Copies of this patent may be obtained for five cents each, by addressing the "Commissioner of Patents, Washington, D. C."